(12) United States Patent
Felix Frias

(10) Patent No.: US 10,391,846 B2
(45) Date of Patent: Aug. 27, 2019

(54) LIFTGATE HANDLE WITH ADJUSTABLE HEIGHT TO IMPROVE REACH AND CLEARANCE REQUIREMENT

(71) Applicant: FORD GLOBAL TECHNOLOGIES, LLC, Dearborn, MI (US)

(72) Inventor: Carlos Humberto Felix Frias, Mexico City (MX)

(73) Assignee: Ford Global Technologies LLC, Dearborn, MI (US)

( * ) Notice: Subject to any disclaimer, the term of this patent is extended or adjusted under 35 U.S.C. 154(b) by 69 days.

(21) Appl. No.: 15/298,519

(22) Filed: Oct. 20, 2016

(65) Prior Publication Data

US 2018/0111455 A1    Apr. 26, 2018

(51) Int. Cl.
| | |
|---|---|
| *B60R 5/04* | (2006.01) |
| *B60J 5/10* | (2006.01) |
| *B60N 3/02* | (2006.01) |
| *B62D 33/037* | (2006.01) |

(52) U.S. Cl.
CPC ............. *B60J 5/106* (2013.01); *B60J 5/107* (2013.01); *B60N 3/023* (2013.01); *B60R 5/04* (2013.01); *B62D 33/037* (2013.01)

(58) Field of Classification Search
CPC .......... B62D 33/037; B60R 5/04; B60J 5/106; B60J 5/107; B60N 3/023
USPC .............................. 16/113.1, 114.1, 405, 429
See application file for complete search history.

(56) References Cited

U.S. PATENT DOCUMENTS

| | | | |
|---|---|---|---|
| 4,114,471 A | 9/1978 | White | |
| 5,730,028 A | 3/1998 | Maue et al. | |
| 5,898,974 A | 5/1999 | Boyer | |
| 6,152,502 A * | 11/2000 | Rossi | B60J 5/101 |
| | | | 292/347 |
| 8,602,948 B2 * | 12/2013 | Bohanan | A63B 21/068 |
| | | | 482/57 |
| 8,864,185 B2 | 10/2014 | Do | |
| 2014/0213423 A1 * | 7/2014 | Masterson | A63B 21/156 |
| | | | 482/131 |

(Continued)

FOREIGN PATENT DOCUMENTS

| | | |
|---|---|---|
| DE | 19954114 A1 | 5/2001 |
| DE | 202014003662 * | 8/2015 |
| DE | 202014003662 U1 | 8/2015 |

(Continued)

OTHER PUBLICATIONS

"Basic Machines and How They Work", prepared by Bureau of Naval Personnel, published by Dover Publications, Inc New York. 1971. p. 11. Found at: http://www.webpal.org/SAFE/aaarecovery/5_simple_technology/basic_machines.pdf (Year: 1971).*

(Continued)

*Primary Examiner* — Emily M Morgan
(74) *Attorney, Agent, or Firm* — Jason Rogers; Vichit Chea; King & Schickli PLLC

(57) ABSTRACT

An adjustable-length handle assembly for a vehicle includes a retractor and a flexible web disposed to deploy from and retract into the retractor. A gripping portion is disposed at a distal end of the flexible web. The assembly may further include a flexible web guide roller having a brake mechanism, to allow adjusting the handle assembly to a desired position.

11 Claims, 3 Drawing Sheets

(56) References Cited

U.S. PATENT DOCUMENTS

2014/0228182 A1* 8/2014 England .............. A63B 21/055
   482/120

FOREIGN PATENT DOCUMENTS

| EP | 1352766 A2 | 10/2003 |
| KR | 20040095050 A | 11/2004 |
| KR | 20050099266 A | 10/2005 |
| KR | 20150073790 A | 7/2015 |

OTHER PUBLICATIONS

English Machine Translation of DE19954114A1.
English Machine Translation of DE202014003662U1.
English Machine Translation of EP1352766A2.
English Machine Translation of KR20040095050A.
English Machine Translation of KR20050099266A.
English Machine Translation of KR20150073790A.

* cited by examiner

LIFTGATE HANDLE WITH ADJUSTABLE HEIGHT TO IMPROVE REACH AND CLEARANCE REQUIREMENT

TECHNICAL FIELD

This document relates generally to the motor vehicle field and, more particularly, to closures and closure systems for vehicle closure panels such as liftgates.

BACKGROUND

Vehicles, particularly those including rear cargo areas, are often provided with vertically articulable closure panels for the cargo areas, for ease of access thereto. An example would be a rear liftgate for a sport-utility vehicle, van, or mini-van.

Such closure panels articulate vertically, i.e. are hingedly attached to the vehicle and swing upwardly when opened. A disadvantage to this configuration is that, when the panel is at a fully opened position, the handle used to close the panel is at a highest position and may be difficult to reach by persons of shorter stature.

To address these and other problems, the present disclosure describes an adjustable-length handle assembly for a vertically articulating closure panel which allows lengthening or shortening the handle length as desired to accommodate a user's stature.

SUMMARY

In accordance with the purposes and benefits described herein, in one aspect an adjustable-length handle assembly for a vertically articulating closure panel for a vehicle is provided, comprising a retractor, a flexible web disposed to deploy from and retract into the retractor, and a gripping portion disposed at a distal end of the flexible web. The assembly may further include a flexible web guide roller and a brake for the flexible web. In embodiments, the retractor and/or the flexible web guide roller are carried by the vertically articulating closure panel.

In embodiments, the retractor comprises a reel including a biasing member disposed to retract the flexible web. The biasing member may be selected from a torsion spring, a flat coil spring, or a constant force spring. The vertically articulating closure panel may be a liftgate.

In other aspects, closures comprising the described extendable handle assembly and vehicles including such closures are described.

In the following description, there are shown and described several preferred embodiments of the disclosed adjustable-length handle. As it should be realized, the devices are capable of other, different embodiments and their several details are capable of modification in various, obvious aspects all without departing from the descriptions set forth herein and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the disclosed adjustable-length handle and together with the description serve to explain certain principles thereof. In the drawing figures.

Reference will now be made in detail to the present preferred embodiments of the described adjustable-length handle, examples of which are illustrated in the accompanying drawing figures.

DETAILED DESCRIPTION

As summarized above, it is desirable to provide an adjustable length handle for a vehicle closure such as a liftgate, to accommodate users of differing heights. To solve this and other problems, at a high level the present disclosure describes an adjustable-length and extendable/retractable handle for a vehicle. It is contemplated to use the described handle in association with a vertically articulating closure panel, for example rear closure panels such as liftgates. However, other uses are possible and contemplated.

Figure 1:
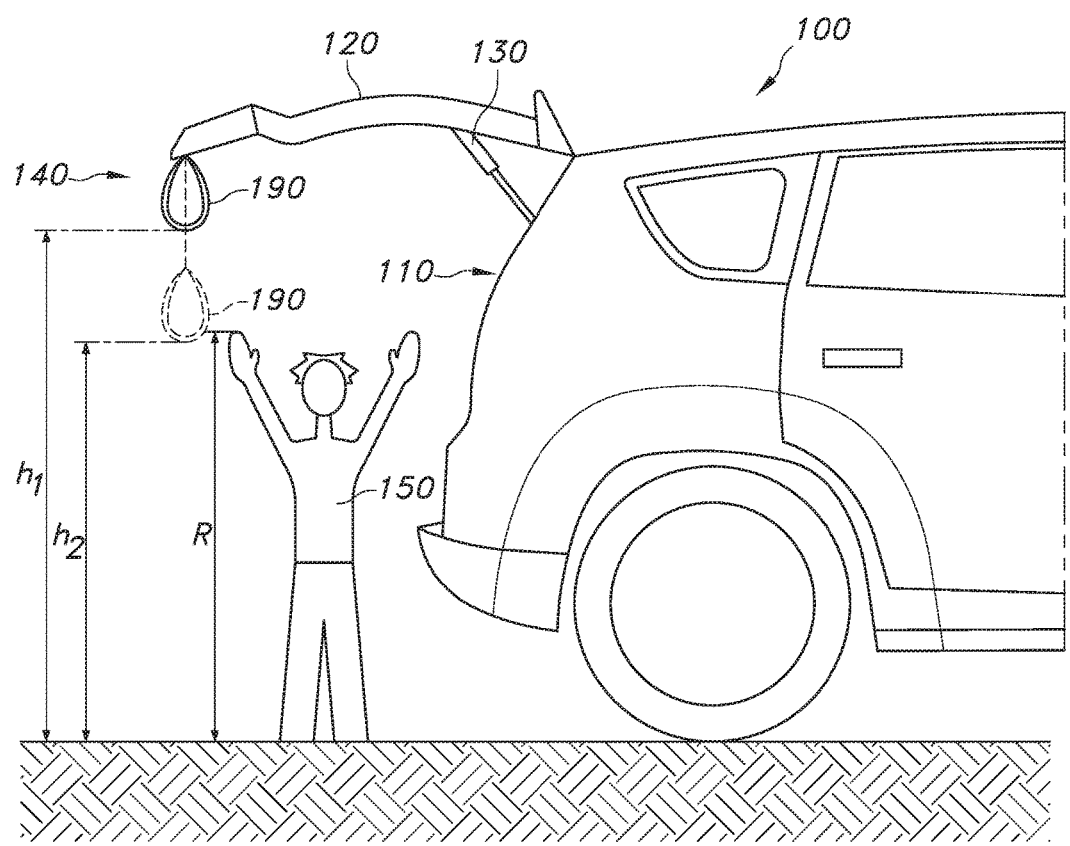
FIG. 1 shows a side view of a vehicle including a vertically articulating rear closure panel.
Figure 2:
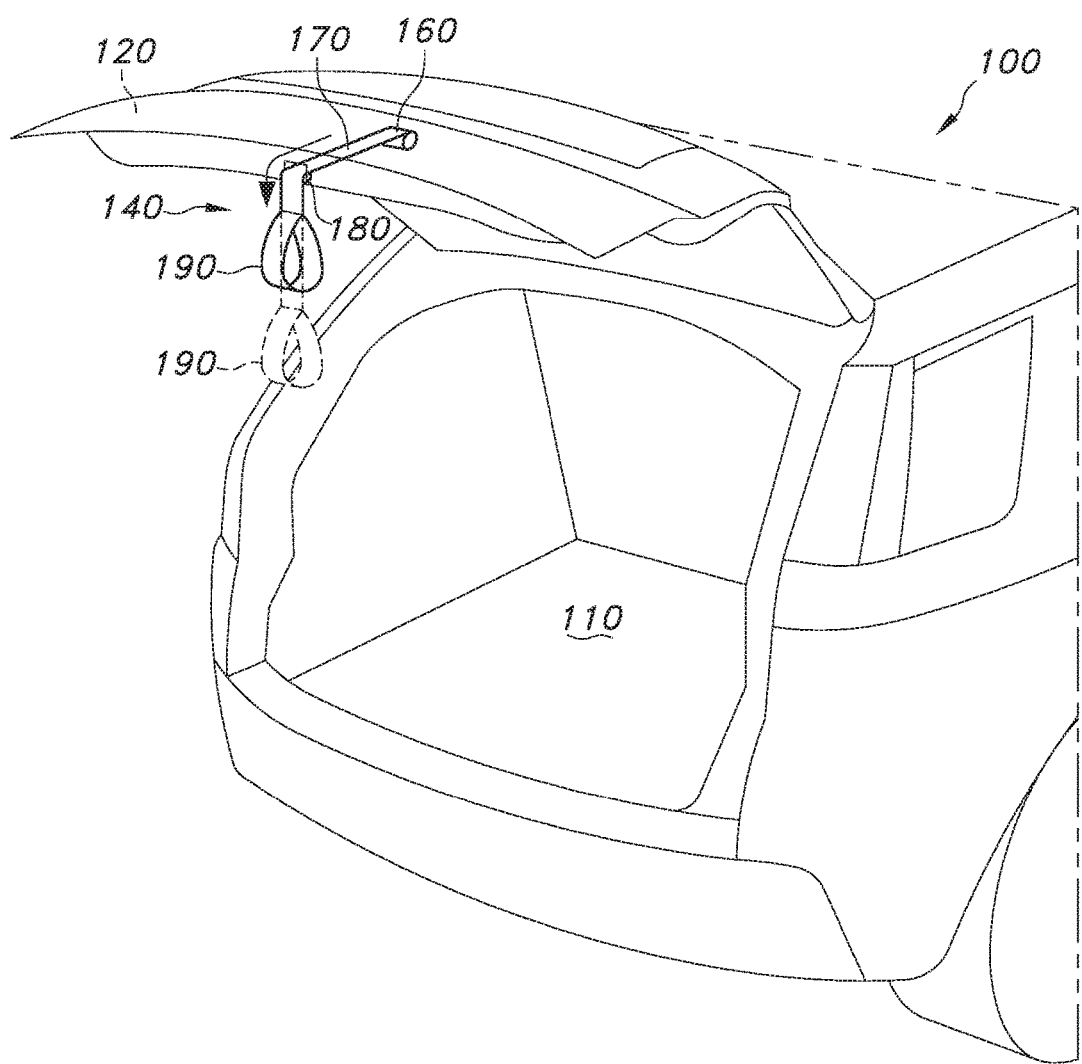
FIG. 2 shows a rear perspective view of the vehicle of FIG. 1, including an adjustable length handle assembly according to the present disclosure.

With reference to FIGS. 1 and 2, there is shown a vehicle 100 including a cargo area 110 and a hinged vertically articulating closure panel 120 such as a liftgate which selectively closes the cargo area. One or more hydraulic cylinders 130 may be provided for damping an opening/closing motion of the vertically articulating closure panel 120 and for holding the panel in a fully opened configuration as shown in the drawing. An adjustable length handle 140 is provided, disposed and configured for accessing by users 150 of varying heights when the vertically articulating closure panel 120 is held in its fully opened configuration as shown.

With reference to FIG. 2 there is shown an adjustable-length handle assembly 140 disposed for deploying from and retracting into the vertically articulating closure panel 120. The assembly 140 includes a retractor 160, a flexible web 170, a flexible web guide roller 180, and a gripping portion 190. In the depicted embodiment, the flexible web guide roller 180 includes a braking mechanism (see discussion below). As depicted, the assembly 140 allows deployment of and retraction into a portion of the vertically articulating closure panel 120 adjacent to an edge distal from the hinged connection of the panel to the vehicle 100.

Figure 3:
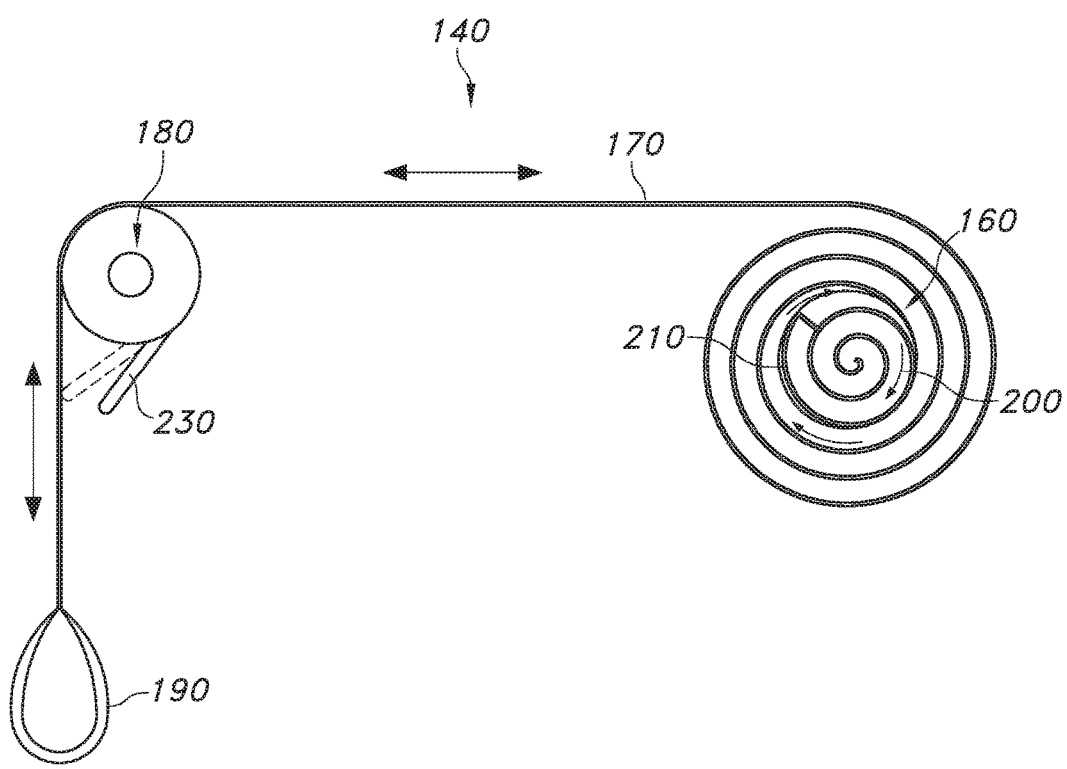
FIG. 3 shows an isolated view of an adjustable-length handle assembly according to the present disclosure.

In more detail, with reference to FIG. 3 the assembly 140 includes a retractor 160 configured to deploy and retract the flexible web 170. Various retractor 160 mechanisms as discussed herein are well-known in the art, for example the deploying/retracting mechanisms used in, e.g., retractable vehicle seat belts, roll-type shades, etc. At a high level, such mechanisms include one or more of a reel 200 configured for deploying/retracting a flexible panel or web and a biasing member 210 disposed to urge the reel to rotate in a direction causing retraction of the flexible web. Any suitable biasing member 210 may be utilized, including without intending any limitation a torsion spring, a flat coil spring, a constant force spring, and others. When a user 150 grasps the gripping portion 190 and pulls, sufficient force is applied to overcome the biasing force of the biasing member 210, and the flexible web 170 deploys.

To cause deployment/retraction of the flexible web 170/gripping portion 190 from a desired portion of the vertically articulating closure panel 120, a flexible web guide roller 180 is provided through which the flexible web is guided, which acts as a hinge point for the band. The flexible web guide roller 180 may be provided with a brake mechanism 230 for selectively preventing motion of the flexible web 170 once the flexible web has been extended or retracted to provide a desired gripping portion 190 height.

In alternative embodiments (not shown), it is known to provide a detent mechanism associated with the reel 200 for preventing any deployment or retraction of the flexible web 170, and a release mechanism to release the detent. The skilled artisan is very familiar with such mechanisms.

The flexible web 170 may be fabricated of any suitable material, for example a webbing or strapping as is known in the seat belt arts, a plastic or polymer, a metal-reinforced plastic or polymer, or others.

As will be appreciated, by the described assembly a convenient, simple and effective adjustable-length handle is provided for a vertically articulating closure panel for a vehicle, for example a rear liftgate. By the described mechanism, a user may easily adjust a length at which the handle hangs relative to the ground when the closure panel is fully opened. Thus, users of practically any stature can be accommodated.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An adjustable-length handle assembly for a vehicle, comprising:
   a retractor carried by a vertically articulating closure panel of a vehicle;
   a flexible web disposed to deploy from and retract into the retractor;
   a flexible web guide roller including a flexible web brake; and
   a gripping portion disposed at a distal end of the flexible web.

2. The handle assembly of claim 1, wherein the retractor comprises a reel carried by a vertically articulating closure panel of a vehicle.

3. The handle assembly of claim 1, wherein the flexible web guide roller is carried by the vertically articulating closure panel.

4. A closure for a vehicle, comprising:
   a vertically articulating closure panel of a vehicle; and
   an adjustable-length handle assembly carried by the vertically articulating closure panel, comprising:
   a retractor;
   a flexible web having a gripping portion and disposed to deploy from and retract into the retractor; and
   a flexible web guide roller including a flexible web brake.

5. The closure of claim 4, further including the gripping portion disposed at a distal end of the flexible web.

6. The closure of claim 4, wherein the flexible web guide roller is carried by the vertically articulating closure panel.

7. A closure for a vehicle, comprising:
   a vertically articulating closure panel of a vehicle; and
   an adjustable-length handle assembly carried by the vertically articulating closure panel, comprising:
   a retractor disposed at a first end of the closure panel;
   a flexible web having a gripping portion and disposed to deploy from and retract into the retractor; and
   a flexible web guide roller including a flexible web brake carried at a second, opposed end of the closure panel.

8. The closure of claim 7, further including the gripping portion disposed at a distal end of the flexible web.

9. The closure of claim 7, wherein the vertically articulating closure panel is a liftgate.

10. The closure of claim 7, wherein the retractor comprises a reel including a biasing member disposed to retract the flexible web.

11. The closure of claim 8, wherein the biasing member is one of a torsion spring, a flat coil spring, or a constant force spring.

* * * * *